United States Patent [19]

Cocksedge

[11] 4,200,323
[45] Apr. 29, 1980

[54] HANDLE ATTACHMENT FOR CONTAINERS

[76] Inventor: John A. Cocksedge, 7488 Mountain Rd., Niagara Falls, Ontario, Canada

[21] Appl. No.: 901,478

[22] Filed: May 1, 1978

Related U.S. Application Data

[63] Continuation-in-part of Ser. No. 738,331, Nov. 2, 1976, abandoned.

[51] Int. Cl.² ............................................ A47J 45/00
[52] U.S. Cl. ................................ 294/33; 294/27 H; 16/114 R; 294/29
[58] Field of Search .................. 294/33, 29, 27 H; 16/110 R, 110 A, 114 R, 114 A, DIG. 24, DIG. 25; 215/100, 101; 224/45 AA, 45 C, 45 P; 220/85 H

[56] References Cited

U.S. PATENT DOCUMENTS

| | | | |
|---|---|---|---|
| 1,377,350 | 5/1921 | Hoskin | 294/33 |
| 2,905,500 | 9/1959 | Thombs | 294/29 |
| 3,503,644 | 3/1970 | Johnson | 294/29 |

*Primary Examiner*—James B. Marbert
*Attorney, Agent, or Firm*—Robert D. Farkas

[57] ABSTRACT

A resilient strap, having each end gradually turned back on itself, forming U-shaped ends, is provided with a concave bend in the lateral surface of the strap between the U-shaped ends. A handle element having an oblong-like opening is secured to the opposed convex surface of the strap. In use, the U-shaped hook-like ends secure portions of the opposed rims of a container such as a metal can, thereby providing a clamping handle attachment for the container.

8 Claims, 7 Drawing Figures

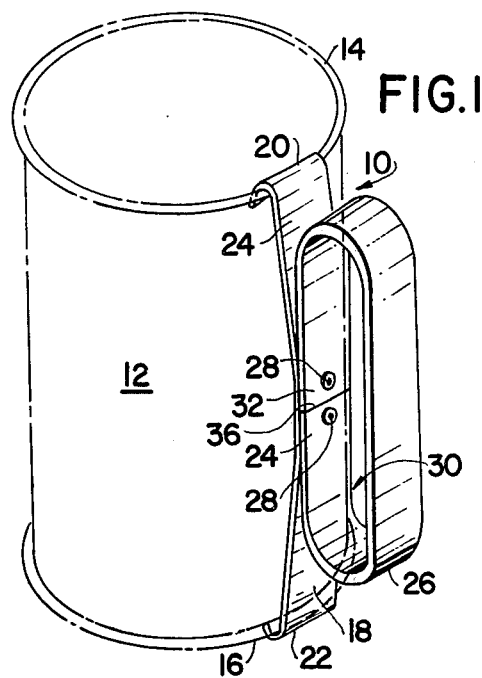

the
HANDLE ATTACHMENT FOR CONTAINERS

BACKGROUND OF THE INVENTION

1. The Field of the Invention

This is a continuation-in-part of my prior application, Ser. No. 738,331, filed Nov. 2, 1976, now abandoned.

2. Description of the Prior Art

The prior art abounds with handle attachments suitable for detachable engagement on paper, plastic and metallic containers. U.S. Pat. No. 2,424,094 issued on July 15, 1947 to V. A. Herr teaches a resilient D-shaped handle formed of resilient strip metal, having each end of the handle bifurcated. Each furcation is provided with a V-shaped hook end adapted to overly and grip the chimes or beads of an end bead container.

U.S. Pat. No. 3,189,937 issued on June 22, 1965 to J. M. Sciortino discloses a handle attachment fabricated from a plastic molding material in the form of a elongated elongted loop. At the bottom inner side of the loop there is a projecting notched ledge adapted to fit under the bottom of a tin can, and at the top there is one or more slideably flexible hook-like extensions that may hook over the top lid of the can.

Both of the aforementioned patents suffer the common deficiencies of failing to provide a convenient means of detaching the V-shaped ends or the protrusions from the rims of the container or to provide a secure anti-spill apparatus which may be simply attached to a container in use.

SUMMARY OF THE INVENTION

A primary object of the present invention is to provide an inexpensive disposable container grasping handle.

Another object of the present invention is to provide a handle which is adapted with a closed opening suitable for insertion of the fingers of the user having a resilient container grasping element affixed thereto.

Still another object of the present invention is to provide a unitary structure which tends to grasp a container more securely when the container is pulled outwardly away from the hand grasping portion of the element.

Yet another object of the present invention is to provide a unitary structure, which when in an unused state, is rolled up so as to occupy a small amount of space, yet is able to adjust to accommodate containers of different heights, when in an unrolled up condition.

Heretofore, apparatus having separated opposed V-shaped or U-shaped hook-like container grasping devices have been disclosed. However, such devices required a complicated and oftentimes difficult procedure to attach or detach the apparatus to the container without running a substantial risk of spilling the contents of the container. The present invention may be attached to a metal can by simply causing the handle attachment to be pressed radially inward towards the center of the can whilst applying an opposed inward radially directed force to the opposed side of the can. By permitting the U-shaped hook-like container grasping devices, attached to the ends of a collapsible or foldable strap, cans of diverse height may be utilized by being grabbed by the present invention. These objects as well as other objects of the present invention, will become more readily apparent after reading the following description of the accompanying drawings.

BRIEF DESCRIPTION OF THE DRAWINGS

FIG. 1 is a perspective view of the present invention shown attached to a container.

FIG. 2 is a side elevation view of the present invention.

FIG. 3 is a top view of the present invention.

FIG. 4 is a front elevation view of the present invention.

FIG. 5 is a rear elevation view of the present invention.

FIG. 6 is a side elevation view of an alternate embodiment of the present invention shown in a rolled up condition.

FIG. 7 is a perspective view of the embodiment depicted in FIG. 6, shown in an extended condition.

DESCRIPTION OF THE PREFERRED EMBODIMENT

The structure and method of fabrication of the present invention is applicable to a first elongated strap-like element, preferably fabricated from a resilient material such as spring metal or a plastic material such as polypropylene. Each end of the first strap element is formed to have a U-shaped hook-like end. The hook-like ends are oppositely directed and have their respective open mouth portions juxtaposed to each other. The central portion of the first strap element is bent slightly so as to have a concave lateral elongated surface co-extensive with the interior portions of each hook-like end. A second strap element, forming a hand grasping device, is attached to or made an integral part of the first strap element, comprising an oblong closed opening. The oblong opening is adapted to provide an opening through which the fingers of the hand of the user can be threaded. A portion of the exterior surface of the second strap element is attached to or formed to be an integral part of the convex surface of the first strap element, disposed parallel to the aforementioned concave portion thereof. The portion of the exterior surface of the second strap element attached to or forming an integral part of the first strap element is confined to a central portion of one elongated side adjacent one elongated marginal edge defining the oblong finger grasping opening. Thus, the first strap element has the greater portion of its length free to flex and thereby provide a more resilient container grasping strap and to assure that a force applied to the container tending to pull the container outwardly from the hand grasping opening, will cause the U-shaped ends to be deflected towards each other, thereby increasing the compressive grasp upon the opposed bead dead edges of the container. The first and second strap elements can be fabricated in a molding process utilizing material throughout. Alternatively, the second strap element may be fabricated from a plastic material secured to the first strap element, utilizing rivets or adhesive therefor.

DESCRIPTION OF AN ALTERNATE EMBODIMENT

Another embodiment of the present invention utilizes the first strap element being fabricated from a resilient material, such as spring metal or a plastic material, such as polypropylene, or the like, wherein such first elongated strap-like element is provided having the curvature extending along the length thereof and disposed arcuately transverse to the longitudinal axis extending along the length of the first element. Thus, the first element may be disposed having a substantial length when the curvature of the first element is permitted to dispose opposed longitudinal marginal edges forming a plane which is slightly displaced from the line passing through the center of the longitudinal elongated axis of the first element. In this position, the first element tends to be rigid because of the curvature therein, much like the curvature experienced by the tape portion of an elongated tapemeasure, when in the elongated state. Each end of the first strap element is formed having U-shaped hook-like ends, similar to the preferred embodiment. A second strap element is utilized, forming a handle portion, and may be attached to the first element, utilizing rivets, if desired, or, if desired, may be made integral therewith, much like the preferred embodiment.

When it is desired to utilize the alternate embodiment, in grasping a can or other container, the hook-like ends may be pulled outwardly, away from one another, thereby disposing a major portion of the length of the first strap element into an elongated state such that curvature extending transverse to the longitudinal length thereof comes into being. In this position, hereinafter referred to as the first state of curvature of the first strap element, the hook-like ends are extended into a position substantially equivalent to the position of the hook-like ends of the preferred embodiment. Thus, the apparatus is disposed ready for use in grasping a container having great height. If it is desired to grasp a container having lesser height, the apparatus comprising the alternate embodiment may have the length of the first strap element thereof shortened by simply applying opposed inwardly directed forces at each end of the first strap element, causing such first strap element to shorten in length, by having the hook-like ends roll up, in almost circular fashion, such that the rolled up portions tend to have the curvature thereof, found when in an extended state, disappear and permitting such rolled up end portions to in fact, roll up. If enough applied force, applied to the ends of the first strap element, is utilized, such first strap element will totally convert into a second state of condition wherein the curvature of the first strap element, defined as the curvature extending transverse to the length of such strap element, across the width thereof, will disappear, causing the first strap element to reside extending transverse to the plane defined by one or both opposed marginal edges thereof, such that the first strap element, when in such second state, has a length substantially equal or less than the length of the second strap element. When it is desired to take the first strap element and extend same into a usable length, all the user need do is to apply opposed outwardly directed forces to the rolled up portion so as to cause same to reside in a partially or fully extended state, and to allow those portions of the first strap element, extending outwardly from and adjacent to the fastening area of the second strap element, to have a curvature extending transverse to the length of such "straightened out" portions. In this manner, the first strap element may be collapsed, into an unused length, extended, into a partially extended length, usable for short containers, and, fully extended, into a fully extended length, usable for grasping containers of maximum height. In point of fact, the alternate embodiment may be utilized to grasp containers having opposed faces which are not provided with rims. This is accomplished by having the adjacent portions of the rolled up portions of the first strap element frictionally and clampingly engage the ends of such containers, despite the fact that they may not be provided with one or two rims at the ends thereof. Additionally, the apparatus described may be useful in grasping containers that are provided with rims wherein the rolled up portions have the adjacent and closest opposed surfaces of the rolled up portions grasp the lid and base of the container such that the rim resides intermediate such closely located opposed surfaces and the portion of the first strap element is which is disposed to the second strap element. In this usage, this embodiment is particularly helpful in grasping containers having a foreshortened height.

Now referring to the figures, and more particularly to the preferred embodiment illustrated in FIG. 1 showing the present invention 10 being secured to container 12 by grasping the upper beaded circumferential edge 16 thereof. Elongated strap element 18 is adapted with an uppermost U-shaped end 20 and a lowermost U-shaped end 22 shown grasping beaded edges 14 and 16 respectively. A portion of the outermost exterior lateral surface 24 of strap element 18 is shown secured to handle grasping element 26 by way of rivets 28. A substantially oblong opening 30 is formed when ends 32 and 34 of strap element 26 are joined together at line 36.

FIG. 2 illustrates strap element 18 having U-shaped ends 20 and 22 formed in the ends thereof. Surface 24 is shown having a convex surface whilst opposed lateral surface 38 is shown having a concave shaped surface, co-extensive with the interior portions 40 and 42 of U-shaped ends 20 and 22 respectively. Handle grasping element 26 is shown secured to convex surface 24 along a portion of one elongated side thereof. Although the embodiment depicted in FIG. 2 employs strap element 18 shown riveted to handle element 26, as shown in FIG. 1, it should be understood that either an adhesive may be utilized in place of the rivets 28, or strap element 18 and finger grasping handle 26 may be formed from a unitary material, such as plastic.

FIG. 3 illustrates the uppermost portion of handle grasping element 26 shown adjacent to the exterior surface of U-shaped end 20 disposed on strap element 18.

FIG. 4 illustrates concave surface 38 of strap element 18 shown having U-shaped ends 20 and 22.

FIG. 5 illustrates convex surface 24 of strap element 18 to which handle grasping element 26 is either secured thereto or integrally formed therewith.

FIG. 6 illustrates another embodiment 8 of the present invention having a first strap element 44 shown coupled to a second strap element 46, utilizing rivets 48 therefor. Opening 50, shown circled by second strap element 46, is the equivalent of opening 30, shown in FIG. 1. Regions 52 and 54, of first strap element 44, are shown extending outwardly from regions 56, of the second strap element 46, so as to define an acute angle between adjacent surfaces 58 and 60, and 62 and 64. Portions 66 and 68, adjacent hook-like ends 70 and 72 respectively, are each shown in a rolled up condition, so as to have surfaces 58 and 62, curved as they are, extend parallel to surface 74, defining the exterior surface of second strap element 46. It should be noted that all of the length of first strap element 44, including portions 52, 54, 66, 68, 70 and 72, thereof, have interior and exterior lateral surfaces thereof extend at all locations thereof, normal to the plane defining edge 76 of strap element 44. Forces applied in the direction of arrows 78 and 80, causes portions 66 and 68 to extend outwardly from the position shown, such that hook-like ends 70 and 72 may be moved outwardly from one another.

FIG. 7 illustrates how the embodiment, shown in FIG. 6, is disposed into an elongated state, when forces 78 and 80, shown in FIG. 6, has been applied to hook-like ends 70 and 72. When in the unrolled up state, as shown, or in the extended state, regions 52 and 54, are shown having surfaces 58 and 62 thereof, in the area adjacent the location of rivets 48, being curved such that the curvature of surfaces of 58 and 62 extend forming a curve which causes surfaces 58 and 62 to have the metal regions thereof extend outwardly from the plane defined as extending normal to marginal edge 76 and wherein such curved surfaces 58 and 62 are normal to the longitudinal axes 82 and 84, shown in dotted lines. In the extended condition, surface portions 86 and 88, shown located adjacent hook-like ends 70 and 72 respectively, are shown having such surfaces being straight and extending normal to marginal edge 76. It should be noted that when hook-like ends 70 and 72 are caused to be directed towards one another, by the application of forces, applied in the direction of arrows 90 and 92, surfaces 58 and 62, starting with the end regions thereof located adjacent surfaces 86 and 88 respectively, more and more flatten or straighten out, equivalent to surfaces 86 and 88, so as to reside in the rolled up condition depicted in FIG. 6. When strap element 44 is in the condition shown in FIG. 7, strap element 44 is extended and has the curvature, shown extending transverse to the longitudinal axes 82 and 84, in regions 58 and 62 thereof. When strap element 44, as shown in FIG. 6, is in the rolled up state, surfaces 58 and 62 are shown having the surfaces thereof in a flattened state, but rolled up, having the generally spiral-like shapes, as shown.

One of the advantages of the present invention is an inexpensive disposable container grasping handle.

Another advantage of the present invention is a handle which is adapted with a closed opening suitable for insertion of the fingers of the user having a resilient container grasping element affixed thereto.

Still another advantage of the present invention is a unitary structure which tends to grasp a container more securely when the container is pulled outwardly away from the hand grasping portion of the element.

Thus there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure therein, but only by the appending claims.

The embodiment of the invention in which an exclusive privilege or property is claimed are defined as follows:

1. A handle attachment for containers comprising a unitary resilient strap having an elongated shape, each free end of the strap being provided with a U-shaped hooked-like end, the portion of the strap defining said free end having concave and convex opposed parallel lateral surfaces, the concave surface being disposed co-extensive with the interior surfaces formed by the U-shaped hooked-like ends, a handle element, said handle element having a substantially oblong opening therein, a portion of the exterior surface of the handle element being disposed fixedly secured to the strap on a portion of the exterior surface thereof being contiguous with said convex surface, said resilient strap having a pair of portions disposed intermediate said hooked ends and said portion of said exterior surface, said pair of portions extending at acute angles to said portion of said exterior surface and outwardly away therefrom, whereby the distance separating said hooked-like ends is greater when the longitudinal axes of said pair of portions is maintained manipulated into co-axial alignment with the longitudinal axis of said portion of said exterior surface than when said pair of portions is free from said manipulation.

2. The handle attachment for containers as claimed in claim 1 wherein the handle element comprises another strap, the ends of the other strap being disposed fixedly secured to each other, said another strap having the exterior lateral surfaces thereof being disposed parallel to said oblong opening.

3. The handle attachment for containers as claimed in claim 1 wherein said strap comprises spring steel.

4. The handle attachment for containers as claimed in claim 1 wherein said strap comprises a resilient plastic material.

5. The handle attachment for containers as claimed in claim 2 wherein said another strap comprises a rigid plastic material.

6. The handle attachment for containers as claimed in claim 2 wherein said strap and said another strap comprise a one piece structure.

7. The handle attachment for containers as claimed in claim 1 wherein said handle element is riveted to said strap.

8. The handle attachment for containers as claimed in claim 1 wherein each of said pair of portions have a surface portion thereon which may be disposed having a curvature extending normal to the length of said each of said pair of portions when said hooked ends thereof are disposed in an extended position and wherein said pair of portions may be disposed having a spiral-like shape, said spiral-like shape including a plurality of co-axially aligned turns in each of said pair of portions, whereby said surface portion is devoid of said curvature when one of said pair of portions having said surface portion thereon is disposed having said spiral-like shape.

* * * * *